US008885162B2

(12) United States Patent
Tomioka

(10) Patent No.: US 8,885,162 B2
(45) Date of Patent: Nov. 11, 2014

(54) DETECTION OPTICAL SYSTEM AND SCANNING MICROSCOPE

(71) Applicant: Olympus Corporation, Tokyo (JP)

(72) Inventor: Masaharu Tomioka, Tokyo (JP)

(73) Assignee: Olympus Corporation, Tokyo (JP)

( * ) Notice: Subject to any disclaimer, the term of this patent is extended or adjusted under 35 U.S.C. 154(b) by 8 days.

(21) Appl. No.: 13/669,634

(22) Filed: Nov. 6, 2012

(65) Prior Publication Data

US 2013/0128268 A1    May 23, 2013

(30) Foreign Application Priority Data

Nov. 18, 2011    (JP) .................................. 2011-252674

(51) Int. Cl.
| | | |
|---|---|---|
| *G01J 3/28* | (2006.01) | |
| *G01J 3/18* | (2006.01) | |
| *G02B 21/00* | (2006.01) | |
| *G01J 3/06* | (2006.01) | |
| *G01J 3/02* | (2006.01) | |
| *G01J 3/44* | (2006.01) | |

(52) U.S. Cl.
CPC .......... *G02B 21/0076* (2013.01); *G01J 3/1838* (2013.01); *G01J 3/06* (2013.01); *G01J 3/0208* (2013.01); *G01J 3/021* (2013.01); *G02B 21/0064* (2013.01); *G01J 3/0237* (2013.01); *G01J 3/4406* (2013.01)
USPC ........................................................ 356/328

(58) Field of Classification Search
USPC .......................................... 356/328, 305, 334
See application file for complete search history.

(56) References Cited

U.S. PATENT DOCUMENTS 3,600,093 A *   8/1971   McMahon ..................... 356/334
6,583,873 B1   6/2003   Goncharov et al.
(Continued)

FOREIGN PATENT DOCUMENTS

JP    2006-010944 A    1/2006
JP    2006-153587 A    6/2006
(Continued)

OTHER PUBLICATIONS

Naoyuki Tamura, Graham J. Murray, Ray M. Sharples, David J. Robertson, & Jeremy R. Allington-Smith, "Measurement of throughput variation across a large format volume-phase holographic grating", Optics Express, vol. 13, No. 11, p. 4125-4133, May 30, 2005.*

(Continued)

*Primary Examiner* — Kara E Geisel
*Assistant Examiner* — Violeta A Prieto
(74) *Attorney, Agent, or Firm* — Holtz, Holtz, Goodman & Chick PC

(57) ABSTRACT

Provided is a detection optical system that is provided with a dispersed-light detection function and that can increase the amount of detected light by enhancing the diffraction efficiency. A detection optical system is employed which includes a transmissive VPH diffraction grating that disperses fluorescence from a specimen into a plurality of wavelength bands; a rotating mechanism that rotates the VPH diffraction grating about an axial line that is perpendicular to an incident optical axis of the fluorescence from the specimen and an emission optical axis from the VPH diffraction grating; a light detection portion that detects the fluorescence from the specimen that has been dispersed by the VPH diffraction grating; and a correcting portion that corrects an incident position on the light detection portion in accordance with a displacement of the optical axis caused by the rotation of the VPH diffraction grating in synchronization with the rotating mechanism.

10 Claims, 6 Drawing Sheets

(56) References Cited

U.S. PATENT DOCUMENTS

| | | |
|---|---|---|
| 6,809,815 B2 | 10/2004 | Knebel |
| 7,256,890 B2 * | 8/2007 | Osawa et al. ............... 356/328 |
| 8,073,020 B2 * | 12/2011 | Jhung et al. ............... 372/20 |
| 8,530,824 B2 * | 9/2013 | Miyazono et al. ............ 250/226 |
| 2002/0021440 A1 * | 2/2002 | Knebel ............... 356/308 |
| 2004/0013365 A1 * | 1/2004 | Lu et al. ............... 385/37 |
| 2004/0264515 A1 * | 12/2004 | Chang et al. ............... 372/20 |
| 2005/0286048 A1 | 12/2005 | Kitagawa |
| 2006/0114458 A1 | 6/2006 | Osawa et al. |
| 2007/0103679 A1 | 5/2007 | Yoo |
| 2007/0160325 A1 * | 7/2007 | Son et al. ............... 385/37 |
| 2008/0151243 A1 * | 6/2008 | Seyfried et al. ............ 356/326 |
| 2009/0185586 A1 * | 7/2009 | Jhung et al. ............... 372/20 |
| 2011/0228267 A1 * | 9/2011 | Hayashi ............... 356/305 |
| 2012/0002198 A1 | 1/2012 | Jhung et al. |
| 2013/0128268 A1 * | 5/2013 | Tomioka ............... 356/328 |
| 2013/0235459 A1 * | 9/2013 | Shiozaki et al. ............ 359/569 |

FOREIGN PATENT DOCUMENTS

| | | |
|---|---|---|
| WO | WO 02/27287 A1 | 4/2002 |
| WO | WO 2010/027140 A2 | 3/2010 |

OTHER PUBLICATIONS

Extended European Search Report (EESR) dated Jan. 23, 2013 (in English) issued in counterpart European Application No. 12007625.2.

* cited by examiner

DETECTION OPTICAL SYSTEM AND SCANNING MICROSCOPE

CROSS-REFERENCE TO RELATED APPLICATIONS

This application is based on Japanese Patent Application No. 2011-252674, the contents of which are incorporated herein by reference.

TECHNICAL FIELD

The present invention relates to a detection optical system and a scanning microscope provided with the same.

BACKGROUND ART

In the related art, there is a known confocal scanning microscope provided with a dispersed-light detection function (for example, see Patent Literature 1). Many confocal scanning microscopes provided with a dispersed-light detection function are employed in fluoroscopy, fluorescence is normally weak, and the amount of fluorescent light obtained per unit time is low. In addition, in the case of a confocal scanning microscope, because a specimen is scanned at high speed, the time for exciting individual points on the specimen is also short. Accordingly, in order to obtain a bright image, it is necessary to efficiently guide fluorescence, generated in a limited amount, to a light detection portion.

AS disclosed in Patent Literature 1, because the currently available confocal scanning microscope with a dispersed-light detection function utilizes a reflective diffraction grating as light-dispersing means, it is not possible to obtain a high diffraction efficiency in a wide range of wavelength bands. This is because a reflective diffraction grating is generally a surface relief diffraction grating that obtains diffracted light by utilizing a relief structure in the surface thereof, and the diffraction efficiency of a surface relief diffraction grating is about 70% at most.

Because the light-dispersing means is generally an optical element causing a large light loss, in a confocal scanning microscope with a dispersed-light detection function, reducing the light loss occurring at the light-dispersing means is effective for improving light utilization efficiency.

A technique designed to reduce the light loss occurring at the light-dispersing means is, for example, disclosed in Patent Literature 2. The technique disclosed in Patent Literature 2 focuses on the polarization dependency of a reflective diffraction grating serving as light-dispersing means and reduces the light loss occurring at the light-dispersing means by making incident light incident after converting it to an s-polarized beam, which exhibits higher diffraction efficiency.

CITATION LIST

Patent Literature

{PTL 1} Japanese Unexamined Patent Application, Publication No. 2006-010944
{PTL 2} Japanese Unexamined Patent Application, Publication No. 2006-153587

SUMMARY OF INVENTION

Technical Problem

With the technique disclosed in Patent Literature 2, although the light loss occurring at the reflective diffraction grating itself is reduced by improving the diffraction efficiency, optical systems before and after the reflective diffraction grating becoming complicated. In addition, light loss occurs in these complicated optical systems.

For example, incident light is split into a p-polarized beam and an s-polarized beam, which are individually guided to the reflective diffraction grating by traveling along different optical paths. Because of this, a polarization beam splitter that splits the incident light into the p-polarized beam and the s-polarized beam is employed, and light loss occurring at the polarization beam splitter. In addition, although a waveplate that rotates a polarized beam in order to convert a p-polarized beam to an s-polarized beam is employed, loss also occurring at the waveplate.

Because of this, even though the diffraction efficiency of the reflective diffraction grating itself is improved, the light utilization efficiency for the microscope as a whole is not sufficiently improved.

The present invention provides a detection optical system that is provided with a dispersed-light detection function and that is capable of increasing the amount of detected light by enhancing the diffraction efficiency thereof, as well as to provide a scanning microscope provided with the same.

Solution to Problem

A first aspect of the present invention is a detection optical system including a transmissive VPH diffraction grating that disperses light from a specimen into a plurality of wavelength bands; a rotating mechanism that rotates the VPH diffraction grating about an axial line that is perpendicular to an incident optical axis of the light from the specimen and an emission optical axis from the VPH diffraction grating; a light detection portion that detects the light from the specimen that has been dispersed by the VPH diffraction grating; and a correcting portion that corrects, in synchronization with the rotating mechanism, an incident position on the light detection portion for light from the specimen in accordance with a displacement of the optical axis caused by the rotation of the VPH diffraction grating.

With the first aspect of the present invention, the light from the specimen is dispersed into the beams in the plurality of wavelength bands by the transmissive VPH (Volume Phase Holographic) diffraction grating. The light from the specimen that has been dispersed by the VPH diffraction grating is detected by the light detection portion. In this case, the VPH diffraction grating is rotated by the rotating mechanism about the axial line that is perpendicular to the incident optical axis of the light from the specimen and the emission optical axis from the VPH diffraction grating. Accordingly, the amount of light detected by the light detection portion can be enhanced by enhancing the diffraction efficiency of the VPH diffraction grating.

In this case, by rotating the VPH diffraction grating, the optical axis of the light from the specimen that has passed through the VPH diffraction grating ends up being displaced. At this time, it is possible to correct, in synchronization with the operation of the rotating mechanism, the incident position on the light detection portion in accordance with the displacement of the optical axis caused by the rotation of the VPH diffraction grating by means of the correcting portion. Accordingly, it is possible to reliably detect the light from the specimen that has been dispersed by the VPH diffraction grating at a predetermined position of the light detection portion, and the dispersion precision can be enhanced.

As described above, with the first aspect of the present invention, the amount of light detected by the light detection portion can be enhanced, and the dispersion precision for the light from the specimen can also be enhanced.

In the above-described aspect, the correcting portion may be provided with a reflecting portion that reflects the light from the specimen; and a reflecting-portion rotating mechanism that rotates the reflecting portion, in synchronization with the rotating mechanism, about an axial line that is parallel to the rotating axis of the VPH diffraction grating.

The incident position on the light detection portion can be corrected, in synchronization with the rotating mechanism, in accordance with the displacement of the optical axis caused by the rotation of the VPH diffraction grating by rotating the reflecting portion about the axial line that is parallel to the rotating axis of the VPH diffraction grating by means of the reflecting-portion rotating mechanism. By configuring the correcting portion in this way, the dispersion precision for the light from the specimen can be enhanced, and a size reduction of the apparatus can also be achieved by making the optical system compact as a whole.

In the above-described aspect, the reflecting-portion rotating mechanism may rotate the reflecting portion just by an angle $\Delta\alpha/2$ about the axial line that is perpendicular to the incident optical axis of the light from the specimen, on the basis of the following expression.

$$\Delta\alpha = 2\sin^{-1}\{N(\lambda_{std}+\Delta\lambda)/2)\} - \sin^{-1}(N\lambda_{std}/2) - \sin^{-1}\{N(\lambda_{std}/2+\Delta\lambda)\}$$

wherein $\Delta\alpha$ is a displacement angle of the optical axis of the light from the specimen that has passed through the VPH diffraction grating, N is a constant determined by the properties of the VPH diffraction grating, $\lambda_{std}$ is a wavelength at which the maximum efficiency is achieved when the angle of the VPH diffraction grating is at a standard angle, and $\Delta\lambda$ is a difference between the wavelength that needs to be detected and the wavelength for which the maximum efficiency is achieved ($\lambda_{std}$).

The displacement of the optical axis caused by the rotation of the VPH diffraction grating can be corrected effectively by rotating the reflecting portion about the axial line that is parallel to the rotation axis of the VPH diffraction grating on the basis of the above-described expression. Accordingly, the dispersion precision for the light from the specimen can be enhanced.

In the above-described aspect, the correcting portion may be provided with a light-detection-portion rotating mechanism that rotates the light detection portion about the rotating axis of the VPH diffraction grating.

The incident position on the light detection portion can be corrected in accordance with the displacement of the optical axis caused by the rotation of the VPH diffraction grating by rotating the light detection portion about the rotation axis of the VPH diffraction grating by means of the light-detection-portion rotating mechanism. By configuring the correcting portion in this way, the dispersion precision for the light from the specimen can be enhanced, and loss of the light from the specimen in optical members can also be eliminated by eliminating optical members such as the reflecting portion or the like, which makes it possible to enhance the detection efficiency of the light detection portion.

In the above-described aspect, the light-detection-portion rotating mechanism may rotate the light detection portion just by an angle $\Delta\alpha$ about the rotating axis of the VPH diffraction grating, on the basis of the following expression.

$$\Delta\alpha = 2\sin^{-1}\{N(\lambda_{std}+\Delta\lambda)/2)\} - \sin^{-1}(N\lambda_{std}/2) - \sin^{-1}\{N(\lambda_{std}/2+\Delta\lambda)\}$$

wherein $\Delta\alpha$ is a displacement angle of the optical axis of the light from the specimen that has passed through the VPH diffraction grating, N is a constant determined by the properties of the VPH diffraction grating, $\lambda_{std}$ is a wavelength at which the maximum efficiency is achieved when the angle of the VPH diffraction grating is at a standard angle, and $\Delta\lambda$ is a difference between the wavelength that needs to be detected and the wavelength for which the maximum efficiency is achieved ($\lambda_{std}$).

The displacement of the optical axis caused by the rotation of the VPH diffraction grating can be corrected effectively by rotating the light detection portion about the rotation axis of the VPH diffraction grating on the basis of the above-described expression. Accordingly, the dispersion precision for the light from the specimen can be enhanced.

In the above-described aspect, the light detection portion may be a multichannel photomultiplier tube.

By employing a multichannel photomultiplier tube as the light detection portion, the light (beams in a plurality of wavelength bands) from the specimen that has been dispersed by the VPH diffraction grating can be simultaneously detected, which makes it possible to perform real-time dispersed-light observation.

In the above-described aspect, a wavelength-selecting slit that selects a wavelength of the light that enters the light detection portion may be provided, wherein the light detection portion may be a single-channel photomultiplier tube.

By employing a single-channel photomultiplier tube as the light detection portion and by selecting the wavelength of the light that enters the light detection portion by means of the wavelength-selecting slit, it is possible to detect light having the selected wavelength from the light (beams in the plurality of wavelength bands) from the specimen that has been dispersed by the VPH diffraction grating. With such a configuration, the cost of the apparatus can be reduced.

A second aspect of the present invention is a scanning microscope including a light source; a scanning portion that scans light emitted from the light source onto a specimen; an objective optical system that focuses the light scanned by the scanning portion onto the specimen and also collects light from the specimen; and a detection optical system described above.

With the second aspect of the present invention, because the above-described detection optical system is provided, the amount of light detected by the light detection portion can be enhanced, and the dispersion precision for the light from the specimen can also be enhanced, which makes it possible to enhance the precision in observing the specimen.

With the present invention, an advantage is afforded in that the amount of detected light can be increased by enhancing the diffraction efficiency.

DESCRIPTION OF EMBODIMENTS

{First Embodiment}

A detection optical system and a microscope provided with the same according to a first embodiment of the present invention will be described with reference to the drawings.

Figure 1:
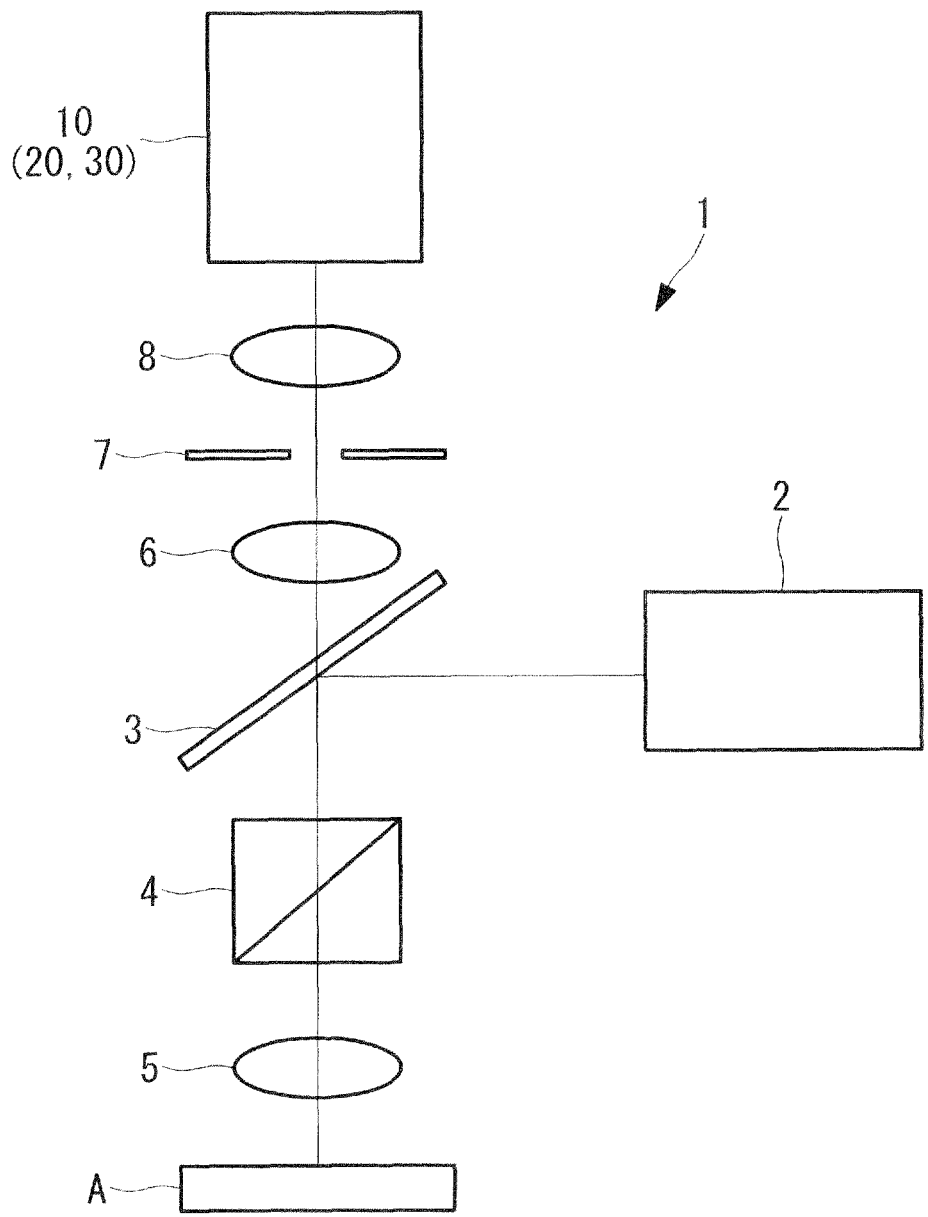
FIG. 1 is a diagram showing, in outline, the configuration of a microscope according to embodiments of the present invention.

As shown in FIG. 1, a microscope 1 according to this embodiment is a confocal scanning microscope and is provided with a laser light source 2 that emits laser light; a dichroic mirror 3 that splits the laser light and fluorescence from a specimen A; a scanning unit (scanning portion) 4 that two-dimensionally scans the laser light on the specimen; an objective lens (objective optical system) 5; a confocal lens 6; a confocal aperture 7 having a pinhole at a position conjugate with a focal position of the objective lens 5; a collimating lens 8; and a detection optical system 10.

The laser light source 2 emits laser light (excitation light) that generates fluorescence by exciting a fluorescent material in the specimen A.

The dichroic mirror 3 reflects the laser light from the laser light source 2 and, on the other hand, transmits the fluorescence generated at the specimen A due to the irradiation with the laser light.

The scanning unit 4 has a pair of galvanometer mirrors (not shown) and is driven by a raster scanning method by changing the swivel angles of the pair of galvanometer mirrors. Accordingly, the laser light from the laser light source 2 can be two-dimensionally scanned on the specimen A.

The objective lens 5 focuses the laser light from the laser light source 2 on the specimen A and, on the other hand, collects the fluorescence generated at the specimen A. The fluorescence collected by the objective lens 5 follows the reverse route to that taken by the laser light and passes through the dichroic mirror 3 via the scanning unit 4.

The confocal lens 6 focuses the fluorescence from the specimen A that has passed through the dichroic mirror 3.

The confocal aperture 7 allows only florescence generated at a focal plane in a specimen A to pass therethrough. Accordingly, fluorescence generated at positions other than the focal position of the objective lens 5 is blocked.

The collimating lens 8 causes the fluorescence that has passed through the confocal aperture 7 to enter the detection optical system 10 as a collimated beam.

Figure 2:
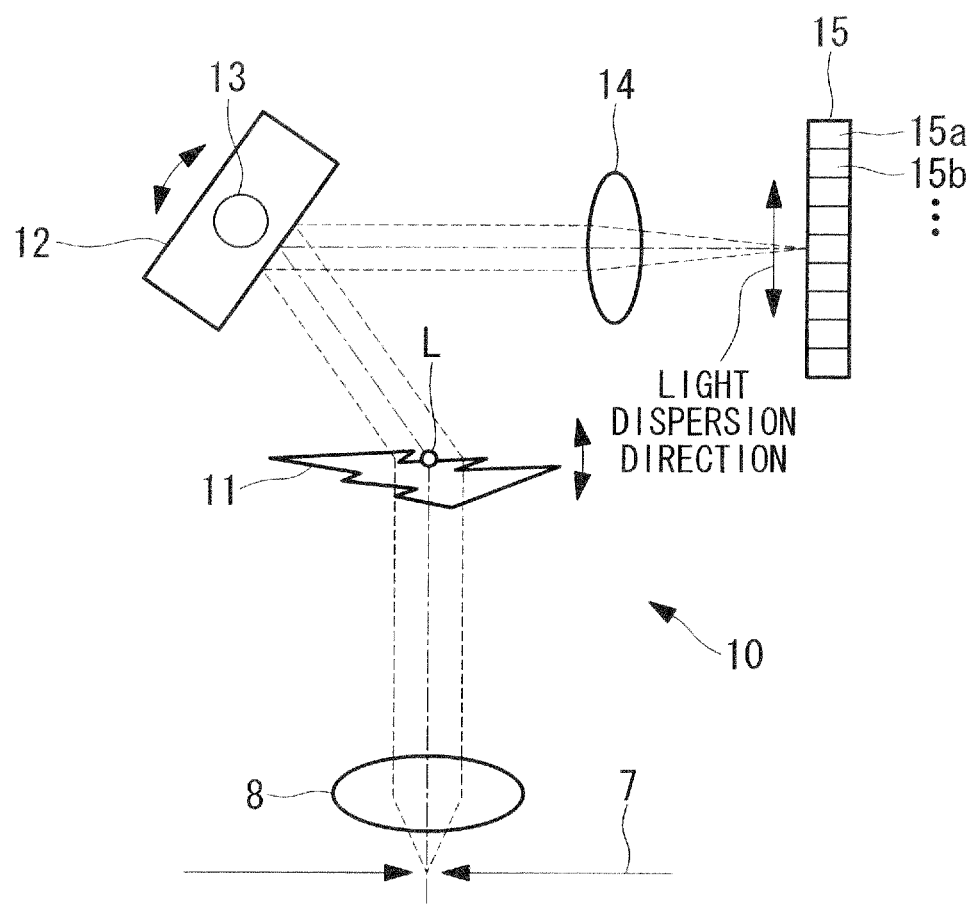
FIG. 2 is a diagram showing, in outline, the configuration of a detection optical system according to a first embodiment of the present invention.

As shown in FIG. 2, the detection optical system 10 is provided with a transmissive VPH diffraction grating 11 that disperses the fluorescence from the specimen A into a plurality of wavelength bands; a reflecting mirror (reflecting portion) 12 that reflects the florescence that has passed through the VPH diffraction grating 11; an imaging lens 14 that images the fluorescence reflected by the reflecting mirror 12; and a light detection portion 15 that detects the fluorescence imaged by the imaging lens 14.

Figure 3:
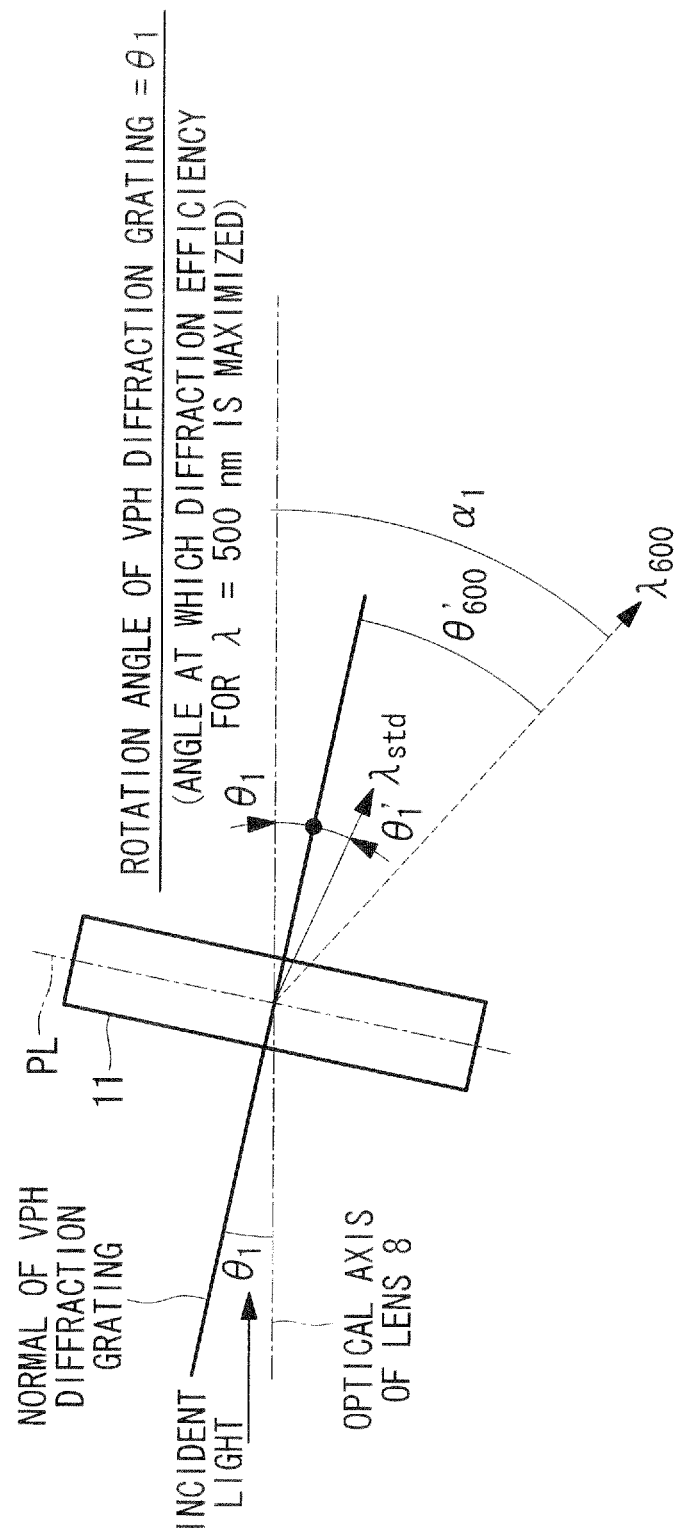
FIG. 3 is a diagram for explaining a specific method of correcting an incident position on a light detection portion in FIG. 2.

The VPH diffraction grating 11 is a transmissive Volume Phase Holographic diffraction grating, and has a VPH layer that periodically changes the refractive index along a principal line PL, as shown in FIG. 3. By having such a configuration, the VPH diffraction grating 11 disperses the fluorescence from the specimen A into the plurality of wavelength bands.

Specifically, the VPH diffraction grating 11 is a transmissive diffraction grating that emits a zero-order diffracted beam in a direction parallel to the incident light and that, from the zero-order diffracted beam, emits first-order diffracted beams at different angles for the individual wavelengths, and has diffraction properties showing a higher diffraction efficiency in a wider wavelength band as compared with the reflective diffraction grating.

In addition, in a general diffraction grating, including the transmissive diffraction grating (VPH diffraction grating 11), an incident angle $\alpha$ and a diffraction angle $\beta$ satisfy the following expression.

$$\sin \alpha + \sin \beta = N\lambda$$

In the above expression, N is the grating frequency of a diffraction grating, and $\lambda$ is the incident wavelength into the diffraction grating.

In the above expression, if N and $\lambda$ are constant, the emission angle $\alpha+\beta$ hardly changes near $\alpha=\beta$. Accordingly, with the transmissive diffraction grating, the emission angles of the first-order diffracted beams with respect to the zero-order beam are substantially constant for the individual wavelengths, even if the incident angle changes, and thus, the diffraction directions are maintained substantially constant irrespective of the incident angle. In particular, when the grating frequency N is small, this approximation is more precisely satisfied.

In addition, the VPH diffraction grating 11 in this embodiment has a rotating mechanism (not shown) that rotates the VPH diffraction grating 11 about an axial line L that is perpendicular to an incident optical axis for the fluorescence from the specimen A and perpendicular to an optical axis of an emitted beam diffracted by the VPH diffraction grating 11. By rotating the VPH diffraction grating 11 by means of this rotating mechanism, the diffraction efficiency of the VPH diffraction grating 11 for the fluorescence from the specimen A is enhanced.

In addition, as shown in FIG. 2, the reflecting mirror 12 is provided with a reflecting-portion rotating mechanism (correcting portion) 13 that, in synchronization with the above-described rotating mechanism, rotates the reflecting mirror 12 about an axial line that is perpendicular to the incident optical axis of the fluorescence from the specimen A. By rotating the reflecting mirror 12 by means of the reflecting-portion rotating mechanism 13, the incident position on the light detection portion 15 is corrected in accordance with a displacement of the optical axis due to the rotation of the VPH diffraction grating 11. Note that a specific method of correcting the incident position on the light detection portion 15 will be described later.

The light detection portion 15 is a multichannel PMT (photomultiplier tube) in which a plurality of channels (reference signs 15a, 15b, and so on) for detecting the fluorescence from the specimen A are arranged in the direction in which the fluorescence is dispersed. The light detection portion 15 separately detects the beams in the plurality of wavelength bands dispersed by the VPH diffraction grating 11 by means of the individual channels.

The operation of the microscope 1 according to this embodiment having the above-described configuration will be described below.

As shown in FIG. 1, the laser light emitted from the laser light source 2 is reflected by the dichroic mirror 3 and enters the objective lens 5 via the scanning unit 4. The objective lens 5 radiates the laser light by focusing it at one point in the specimen A. Accordingly, the fluorescent material in the specimen A is excited by the laser light, generating fluorescence.

The fluorescence from the specimen A travels in reverse along the same optical path as the laser light, and is made incident on the dichroic mirror 3 via the objective lens 5 and the scanning unit 4. Then, the fluorescence from the specimen A passes through the dichroic mirror 3 and is focused by the confocal lens 6. Because the confocal aperture 7 has the pinhole at the position that is optically conjugated with the focal position of the objective lens 5, only the fluorescence generated at the focal position of the objective lens 5 passes through the confocal aperture 7. Subsequently, the fluorescence is converted to a substantially collimated beam by the collimating lens 8 and enters the detection optical system 10.

As shown in FIG. 2, with the detection optical system 10, the fluorescence from the specimen A is dispersed into beams in a plurality of wavelength bands by means of the VPH diffraction grating 11. At this time, the fluorescence is diffracted at the VPH diffraction grating 11, and the diffracted beams are separately emitted at different diffraction angles in accordance with the individual wavelengths. The first-order diffracted beams (fluorescence) separately emitted at different diffraction angles in accordance with the individual wavelengths are reflected by the reflecting mirror 12 and separately enter the imaging lens 14 at different angles relative to the optical axis in accordance with the individual wavelengths. Accordingly, the first-order diffracted beams separately enter the light detection portion 15 by means of the imaging lens 14 at different positions (channels) in accordance with the individual wavelengths, thus being separately detected by the different channels in accordance with the wavelengths.

The first-order diffracted beams (fluorescence) detected by the light detection portion 15 are converted to electrical signals, and fluorescence image formation, other analyses, or the like are performed on the basis of the electrical signals related to individual points in the specimen A obtained by scanning the specimen A by means of the scanning unit 4. Then, the fluorescence image or the analysis results are displayed on a display portion (not shown), such as a monitor or the like.

In this case, depending on the wavelength of fluorescence that needs to be detected, the VPH diffraction grating 11 is rotated by means of the rotating mechanism (not shown) about the axial line L that is perpendicular to the incident optical axis of the fluorescence from the specimen A and perpendicular to the optical axis of the emitted light diffracted by the VPH diffraction grating 11. Accordingly, the amount of fluorescence light detected by the light detection portion 15 can be enhanced by enhancing the diffraction efficiency of the VPH diffraction grating 11.

At this time, by rotating the VPH diffraction grating 11, the optical axis of the fluorescence from the specimen A that has passed through the VPH diffraction grating 11 ends up being displaced. In this case, by rotating the reflecting mirror 12 by means of the reflecting-portion rotating mechanism 13 in synchronization with the operation of the rotating mechanism, the incident position on the light detection portion 15 can be corrected in accordance with the displacement of the optical axis due to the rotation of the VPH diffraction grating 11. Accordingly, the fluorescence from the specimen A that has been dispersed by the VPH diffraction grating 11 can reliably be detected at the predetermined positions (channels) of the light detection portion 15, and the dispersion precision thereof can be enhanced.

As has been described above, with the detection optical system 10 and the microscope 1 provided with the same according to this embodiment, the amount of light detected by the light detection portion 15 can be enhanced, and the dispersion precision for the fluorescence from the specimen A can also be enhanced.

In addition, by forming a correcting portion that corrects the incident position on the light detection portion 15 with the above-described reflecting mirror 12 and the reflecting-portion rotating mechanism 13, the dispersion precision for the fluorescence from the specimen A can be enhanced, and a size reduction of the apparatus can be achieved by making the optical system compact as a whole.

In addition, by employing a multichannel PMT as the light detection portion 15, the fluorescence from the specimen A that has been dispersed by the VPH diffraction grating 11 (beams in the plurality of wavelength bands) can be simultaneously detected, which makes it possible to perform real-time dispersed-light observation.

Here, a specific method of correcting the incident position on the light detection portion 15, that is, a specific method of adjusting the rotation angle of the reflecting mirror 12 by means of the reflecting-portion rotating mechanism 13, will be described below by using FIGS. 3 and 4. A calculation method for a shift in the angle of the emission optical axis for the fluorescence from the specimen A will be described here for the case in which the VPH diffraction grating 11 is rotated from the state shown in FIG. 3 to the one shown in FIG. 4.

A wavelength $\lambda_{std}$ at which the diffraction efficiency is maximized when the rotation angle of the VPH diffraction grating 11 is at a standard angle $\theta_1$ is assumed to be 500 nm, and a wavelength $\lambda_{600}$ that needs to be detected is assumed to be 600 nm.

FIG. 3 shows a state in which the rotation angle of the VPH diffraction grating 11 is at the standard angle $\theta_1$ (a state in which the diffraction efficiency for the standard wavelength $\lambda_{std}$ is maximized).

Figure 4:
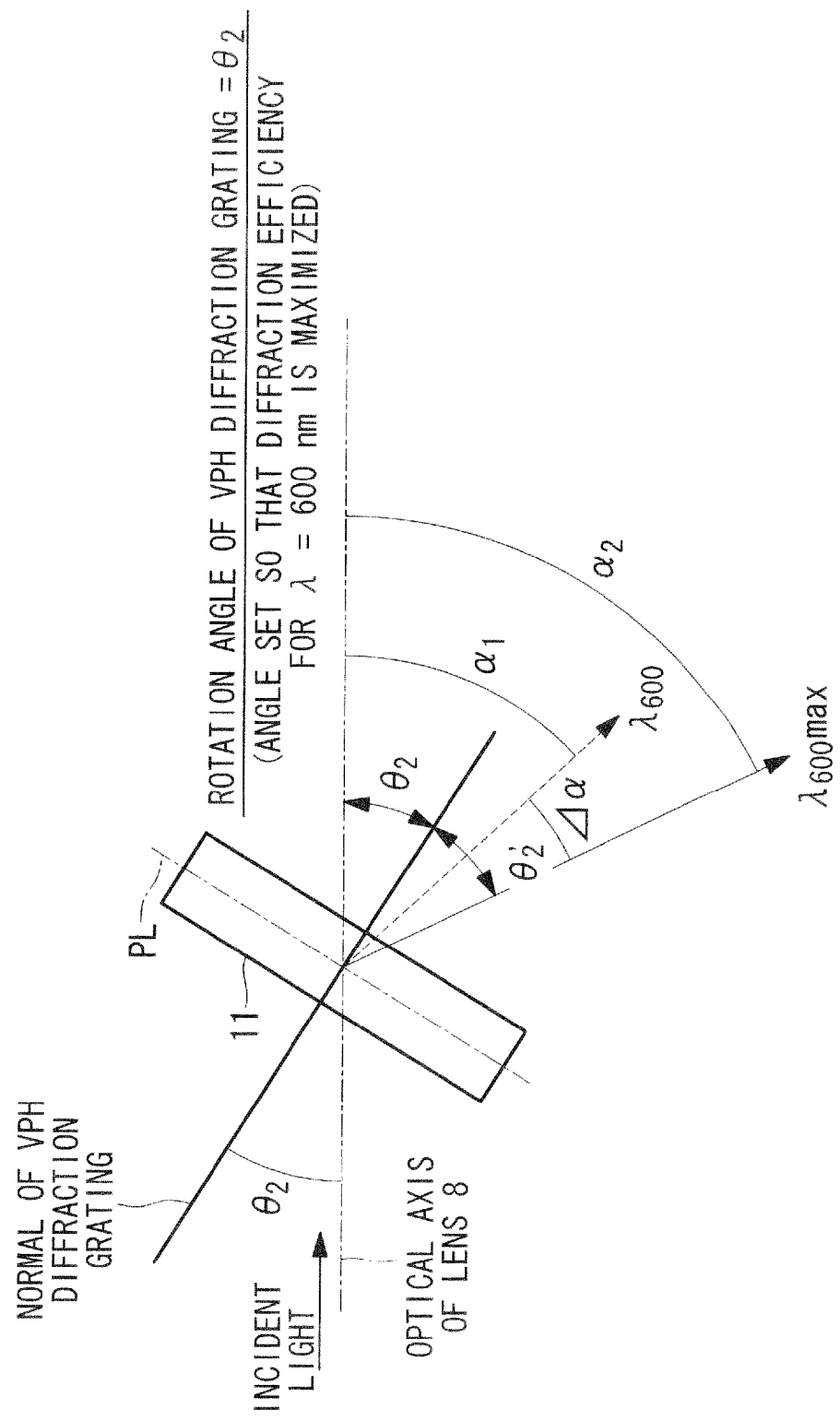
FIG. 4 is a diagram for explaining the specific method of correcting the incident position on the light detection portion in FIG. 2.

FIG. 4 shows a state in which the VPH diffraction grating 11 has been rotated to a rotation angle $\theta_2$ at which the diffraction efficiency for $\lambda_{600}$ (=600 nm), which is the wavelength that needs to be detected, is maximized.

The meanings of individual reference signs in FIGS. 3 and 4 are as follows.

$\lambda_{std}$: wavelength for which the VPH diffraction grating 11 achieves the maximum efficiency (design standard wavelength).

$\Delta\lambda$: difference between the detection target wavelength and the wavelength for which the maximum efficiency is achieved (design standard wavelength $\lambda_{std}$).

$\lambda_{600}$: detection target wavelength.

N: a constant determined by the properties of the VPH diffraction grating 11.

$\theta_1'$: diffraction angle for the design standard wavelength $\lambda_{std}$.

$\theta_{600}'$: diffraction angle for the detection wavelength $\lambda_{600}$ (for the case of the state shown in FIG. 3).

$\theta_2'$: diffraction angle for the case in which the diffraction efficiency is maximized for the detection wavelength $\lambda_{600}$ (the state shown in FIG. 4).

$\alpha_1$: emission angle for the detection wavelength $\lambda_{600}$ for the case in which the rotation angle of the VPH diffraction grating is $\theta_1$ (FIG. 3).

$\alpha_2$: emission angle for the detection wavelength $\lambda_{600}$ for the case in which the rotation angle of the VPH diffraction grating is $\theta_2$ (FIG. 4).

In FIGS. 3 and 4, a broken line indicated by $\lambda_{600}$ indicates the optical axis along which a beam of the wavelength $\lambda_{600}$ is emitted in the state shown in FIG. 3, where the rotation angle of the VPH diffraction grating is $\theta_1$.

In FIG. 4, a solid line indicated by $\lambda_{600}$max indicates the optical axis along which a beam of wavelength $\lambda_{600}$ is emitted in the state shown in FIG. 4, where the diffraction efficiency for the detection wavelength $\lambda_{600}$ is maximized.

From FIG. 3, the following expressions are derived.

$$\sin\theta_1 + \sin\theta_{600}' = Nm\lambda_{600} \tag{1}$$

$$\sin\theta_1 + \sin\theta_1' = Nm\lambda_{s\,t\,d} \tag{2}$$

In expression (2) above, because $\theta_1 = \theta_1'$ when the maximum efficiency is achieved for $\lambda_{std}$, the following expression is derived.

$$\sin\theta_1 = \sin\theta_1' = Nm\lambda_{s\,t\,d}/2 \tag{2'}$$

Because m=1 in expressions (1) and (2), the following expression is derived.

$$\sin\theta_{600}' = N(\lambda_{600} - \lambda_{s\,t\,d}/2)$$

Therefore, $\theta_{600}' = \sin^{-1}\{N(\lambda_{600} - \lambda_{s\,t\,d}/2)\}$ Here, because $\alpha_1 = \theta_1 + \theta_{600}' = \theta_1' + \theta_{600}'$, the following expression is derived.

$$\alpha = \sin^{-1}(N\lambda_{s\,t\,d}/2) + \sin^{-1}\{N(\lambda_{600} - \lambda_{s\,t\,d}/2)\} \tag{3}$$

On the other hand, in FIG. 4, the following expression is derived.

$$\sin\theta_2 + \sin\theta_2' = Nm\lambda_{600} \tag{4}$$

In expression (4) above, because $\theta_2 = \theta_2'$ when the maximum efficiency is achieved for $\lambda_{600}$, the following expression is derived.

$$\sin\theta_2 = \sin\theta_2' = Nm\lambda_{600}/2 \tag{4'}$$

Here, because m=1 in expression (4)' above, the following expressions are derived.

$$\theta_2' = \sin^{-1}(N\lambda_{600}/2)$$

$$\alpha_2 = 2\theta_2' = 2\sin^{-1}(N\lambda_{600}/2) \tag{5}$$

In addition, $\Delta\alpha = \alpha_2 - \alpha_1$.

By substituting expressions (3) and (5) into the above expression, the following expression is derived.

$$\Delta\alpha = 2\sin^{-1}(N\lambda_{600}/2) - \sin^{-1}(N\lambda_{s\,t\,d}/2) - \sin^{-1}\{N(\lambda_{600} - \lambda_{s\,t\,d}/2)\}$$

Here, because $\lambda_{600} = \lambda_{s\,t\,d} + \Delta\lambda$, the following expression is derived.

$$\Delta\alpha = 2\sin^{-1}\{N(\lambda_{s\,t\,d} + \Delta\lambda)/2)\} - \sin_{-1}(N\lambda_{s\,t\,d}/2) - \sin^{-1}\{N(\lambda_{s\,t\,d}/2 + \Delta\lambda)\} \tag{6}$$

As described above, in the case in which the VPH diffraction grating 11 is rotated from the state shown in FIG. 3 to the one shown in FIG. 4, the shift in the angle of the emission optical axis of the fluorescence from the specimen A, that is, $\Delta\alpha\ (=\alpha_2 - \alpha_1)$, is a function that includes only $\Delta\lambda$, as shown in expression (6) above. In other words, on the basis of expression (6) above, the displacement of the optical axis caused by the rotation of the VPH diffraction grating 11 can be corrected just by rotating the reflecting mirror 12 by an angle $\Delta\alpha/2$ about the axial line perpendicular to the incident optical axis of the fluorescence from the specimen A. Accordingly, the fluorescence from the specimen A which has been dispersed by the VPH diffraction grating 11 can reliably be detected at the predetermined positions (channels) of the light detection portion 15, and the dispersion precision for the fluorescence from the specimen A can be enhanced.

{Second Embodiment}

Next, a detection optical system according to a second embodiment of the present invention will be described with reference to FIG. 5. Hereinafter, for detection optical systems and microscopes provided with the same according to the individual embodiments, the same reference signs will be assigned to commonalities with the above-described embodiment, descriptions thereof will be omitted, and differences will mainly be described.

Figure 5:
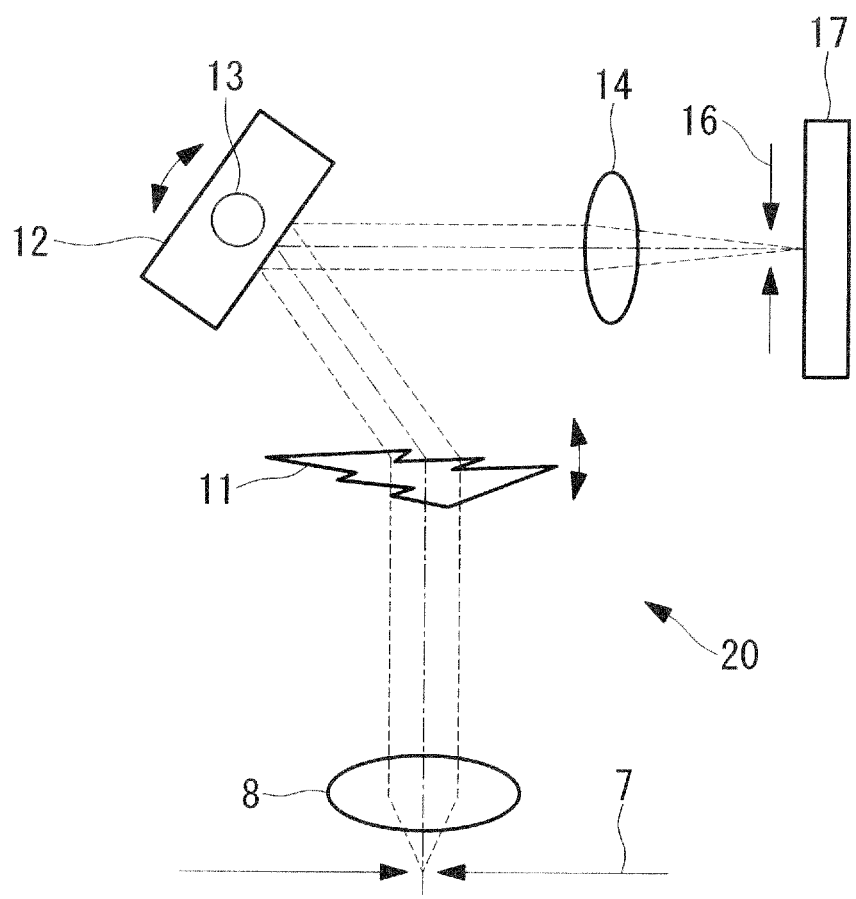
FIG. 5 is a diagram showing, in outline, the configuration of a detection optical system according to a second embodiment of the present invention.

As shown in FIG. 5, instead of the light detection portion 15, which is a multichannel PMT, in the configuration of the detection optical system 10 according to the above-described first embodiment (see FIG. 2), a detection optical system 20 according to this embodiment is provided with a light detection portion 17, which is a single-channel PMT, and a wavelength-selecting slit 16 that selects the wavelength of light that enters the light detection portion 17.

By employing a single-channel PMT as the light detection portion 17 and by selecting the wavelength of the light that enters the light detection portion 17, which is a single-channel PMT, by means of the wavelength-selecting slit 16, it is possible to detect light having the selected wavelength from the fluorescence (beams in the plurality of wavelength bands) from the specimen A that has been dispersed by the VPH diffraction grating 11. With such a configuration, the cost of the apparatus can be reduced.

{Third Embodiment}

Next, a detection optical system according to a third embodiment of the present invention will be described with reference to FIG. 6.

Figure 6:
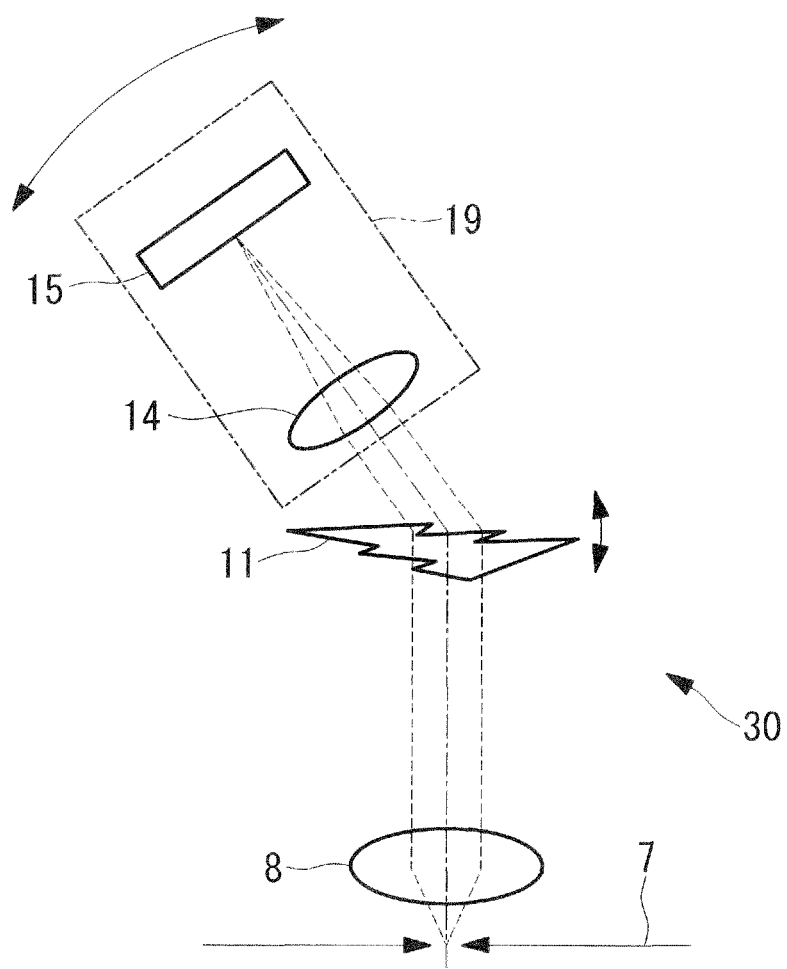
FIG. 6 is a diagram showing, in outline, the configuration of a detection optical system according to a third embodiment of the present invention.

As shown in FIG. 6, instead of the reflecting mirror 12 and the reflecting-portion rotating mechanism 13 in the configuration of the detection optical system 10 according to the above-described first embodiment (see FIG. 2), a detection optical system 30 according to this embodiment is provided with a light-detection-portion rotating mechanism (correcting portion) 19 that rotates the light detection portion 15 and the imaging lens 14 about the rotation axis of the VPH diffraction grating 11.

By rotating the light detection portion 15 and the imaging lens 14 about the rotation axis of the VPH diffraction grating 11 by means of the light-detection-portion rotating mechanism 19, it is possible to correct the incident positions on the light detection portion 15 for the fluorescence (beams in the plurality of wavelength bands) from the specimen A in accordance with the displacement of the optical axis caused by the rotation of the VPH diffraction grating 11. By configuring the correcting portion that corrects the incident positions on the light detection portion 15 in this way, the dispersion precision for the fluorescence from the specimen A can be enhanced, and the loss of fluorescence from the specimen A at optical members such as the reflecting mirror 12 or the like in the first embodiment can also be eliminated, which makes it possible to enhance the detection efficiency of the light detection portion 15.

Note that, specifically, the light-detection-portion rotating mechanism 19 can correct the displacement of the optical axis caused by the rotation of the VPH diffraction grating 11 just by rotating the light detection portion 15 and the imaging lens 14 by the angle $\Delta\alpha$ about the rotation axis of the VPH diffraction grating 11 on the basis of the above-described expression (6).

As has been described, although the individual embodiments of the present invention have been described in detail with reference to the drawings, the specific configuration is not limited to these embodiments, and design alterations, etc. with a range that does not depart from the spirit of the present invention are also encompassed. For example, the present invention may be employed in an embodiment in which the individual embodiments described above are appropriately combined.

REFERENCE SIGNS LIST

A specimen
1 microscope
2 laser light source
3 dichroic mirror
4 scanning unit (scanning portion)
5 objective lens (objective optical system)
6 confocal lens
7 confocal aperture
8 collimating lens
10, 20, 30 detection optical system
11 VPH diffraction grating
12 reflecting mirror (reflecting portion)
13 reflecting-portion rotating mechanism (correcting portion)
14 imaging lens
15 light detection portion
16 wavelength-selecting slit
17 light detection portion
19 light-detection-portion rotating mechanism (correcting portion)

The invention claimed is:

1. A detection optical system comprising:
a transmissive volume phase holographic (VPH) diffraction grating that disperses light from a specimen into a plurality of wavelength bands;
a rotating mechanism that rotates the VPH diffraction grating about an axial line that is perpendicular to an incident optical axis of the light from the specimen and an emission optical axis from the VPH diffraction grating;
a light detection portion that detects the light from the specimen that has been dispersed by the VPH diffraction grating; and
a correcting portion that corrects, in synchronization with the rotating mechanism, an incident position on the light detection portion for light from the specimen in accordance with a displacement of the emission optical axis caused by the rotation of the VPH diffraction grating,
wherein the correcting portion corrects a difference between: (i) a first emission angle, at which the light from the specimen having a predetermined wavelength is emitted from the VPH diffraction grating when the VPH diffraction grating is at a first rotation angle, and (ii) a second emission angle, at which the light from the specimen having the predetermined wavelength is emitted from the VPH diffraction grating when the VPH diffraction grating is at a second rotation angle.

2. The detection optical system according to claim 1, wherein the correcting portion comprises:
a reflecting portion that reflects the light from the specimen; and
a reflecting-portion rotating mechanism that rotates the reflecting portion, in synchronization with the rotating mechanism, about an axial line that is parallel to a rotating axis of the VPH diffraction grating.

3. The detection optical system according to claim 2, wherein the reflecting-portion rotating mechanism rotates the reflecting portion by an angle $\Delta\alpha/2$ about the axial line, based on the following expression:

$$\Delta\alpha = 2\sin^{-1}\{N(\lambda_{s\,t\,d}+\Delta\lambda)/2)\} - \sin^{-1}(N\lambda_{s\,t\,d}/2) - \sin^{-1}\{N(\lambda_{s\,t\,d}/2+\Delta\lambda)\}$$

wherein:
$\Delta\alpha$ is a displacement angle of the emission optical axis of the light from the specimen that has passed through the VPH diffraction grating,
N is a constant determined by the properties of the VPH diffraction grating,
$\lambda_{s\,t\,d}$ is a wavelength at which a maximum efficiency is achieved when the angle of the VPH diffraction grating is at a standard angle, and
$\Delta\lambda$ is a difference between a wavelength that needs to be detected and the wavelength for which the maximum efficiency is achieved.

4. The detection optical system according to claim 1, wherein the correcting portion comprises a light-detection-portion rotating mechanism that rotates the light detection portion by an angle $\Delta\alpha$ about a rotating axis of the VPH diffraction grating.

5. The detection optical system according to claim 4, wherein the light-detection-portion rotating mechanism rotates the light detection portion about the rotating axis of the VPH diffraction grating, based on the following expression:

$$\Delta\alpha = 2\sin^{-1}\{N(\lambda_{s\,t\,d}+\Delta\lambda)/2)\} - \sin^{-1}(N\lambda_{s\,t\,d}/2) - \sin^{-1}\{N(\lambda_{s\,t\,d}/2+\Delta\lambda)\}$$

wherein:
$\Delta\alpha$ is a displacement angle of the emission optical axis of the light from the specimen that has passed through the VPH diffraction grating,
N is a constant determined by the properties of the VPH diffraction grating,
$\lambda_{s\,t\,d}$ is a wavelength at which a maximum efficiency is achieved when the angle of the VPH diffraction grating is at a standard angle, and
$\Delta\lambda$ is a difference between a wavelength that needs to be detected and the wavelength for which the maximum efficiency is achieved.

6. The detection optical system according to claim 1, wherein the light detection portion is a multichannel photomultiplier tube.

7. The detection optical system according to claim 1, further comprising a wavelength-selecting slit that selects a wavelength of the light that enters the light detection portion, wherein the light detection portion is a single-channel photomultiplier tube.

8. A scanning microscope comprising:
a light source;
a scanning portion that scans light emitted from the light source onto the specimen;
an objective optical system that focuses the light scanned by the scanning portion onto the specimen and also collects light from the specimen; and
the detection optical system according to claim 1.

9. The detection optical system according to claim 1, wherein the light detection portion is a multichannel detector.

10. The detection optical system according to claim 1, further comprising a wavelength-selecting slit that selects a wavelength of the light that enters the light detection portion, wherein the light detection portion is a single-channel detector.

* * * * *